Nov. 13, 1928.
E. H. GATES
1,691,279
MEASURING INSTRUMENT
Filed July 6, 1925
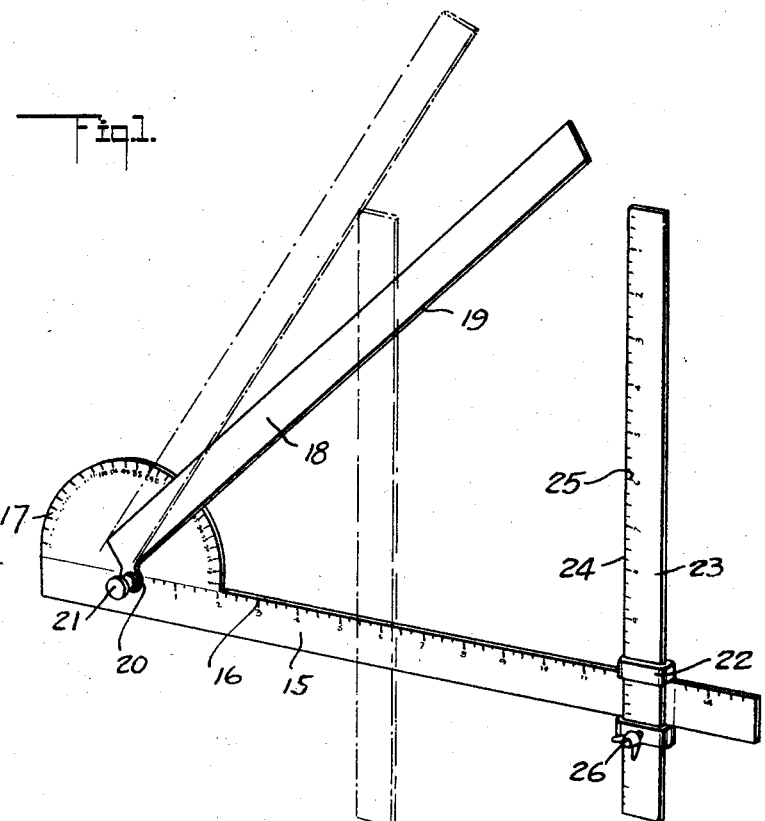
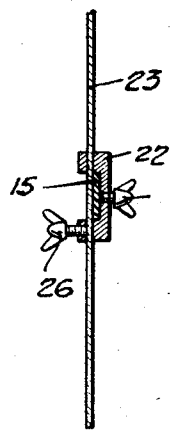
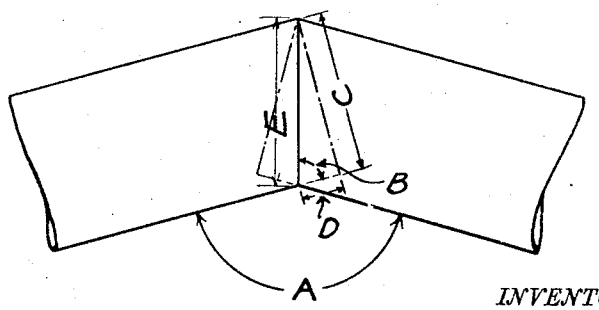
INVENTOR.
ELIZABETH H. GATES
BY
*Munn & Co.*
ATTORNEY Patented Nov. 13, 1928.

1,691,279

UNITED STATES PATENT OFFICE.

ELIZABETH H. GATES, OF LOS ANGELES, CALIFORNIA.

MEASURING INSTRUMENT.

Application filed July 6, 1925. Serial No. 41,845

My invention relates to measuring instruments and more particularly to an instrument by which an unknown dimension of a side or angle of a triangle can be readily obtained, and the purpose of my invention is the provision of an instrument of this character which is particularly adapted, although not necessarily, for use in determining the angle at which the confronting ends of two pipes are to be cut in order to provide a perfect butt joint between the two when desiring to form an elbow of a predetermined angle.

It is also a purpose of my invention to provide a measuring instrument of the above described character which is extremely simple and durable in construction and having elements connected to permit the ready and rigid securing thereof in any adjusted position so as to facilitate the determination of any angle at which a pipe is adapted to be cut.

I will describe only one form of measuring instrument embodying my invention and will then point out the novel features thereof in claim.

In the accompanying drawings

Figure 1 is a view showing in perspective one form of measuring instrument embodying my invention.

Figure 2 is a fragmentary vertical sectional view taken on the line 2—2 of Figure 1.

Figure 3 is a fragmentary view showing in side elevation a pipe elbow joint formed by the use of the measuring instrument and showing diagrammatically the dimensions necessary in determining the angle at which the meeting ends of two pipes are adapted to be cut.

Referring specifically to the drawings, in which similar reference characters refer to similar parts in each of the views, my invention in its present embodiment comprises a bar 15 which in the use of the instrument is stationary. This bar has a graduated straight edge to provide a linear scale 16 which reads from left to right beginning at the index of a protractor 17 mounted on the bar 15 or formed integral therewith as shown. At the axis of the protractor a stud is formed to provide a pivotal mounting for an arm 18 the latter having a straight edge 19 and an extension 20 through which the stud extends to support the arm for pivotal movement over the protractor 17 so that it can be adjusted to any desired angular position on the protractor and secured in such position by means of a screw cap or nut 21 mounted on the threaded end of the stud.

A yoke 22 is slidably mounted on the bar 15 and adjustable vertically in the yoke is a movable bar 23 having a straight edge 24 graduated to provide a linear scale 25 and mounted in the plane of the pivoted arm 18. This bar 23 is slidable in the yoke 22 but is adapted to be secured in any adjusted position vertically by means of a set screw 26 as clearly illustrated in Figure 2.

By reference to Figure 3, it will be seen that in practice the angle at which the confronting ends of a pair of pipes are to be cut to form an elbow of any desired angle is determined by dividing the included angle designated at A by two which will be the angle B of the triangle described by the sides C, D and E. The side C being the outside diameter of the pipe is known and there remains to determine the length of the side D in order to ascertain the point from the end of the pipe at which it is to be cut to mate with an identically cut pipe in forming the elbow.

In employing the instrument the movable bar 23 is adjusted vertically in the yoke 22 until the distance from the edge 16 of the bar 15 to the upper end of the bar 23 is equal to the diameter of the pipe as can be determined by reference to the scale 25. The arm 18 is now swung about its pivot 20 until its edge 19 intercepts the scale of the protractor 17 with the point corresponding in degrees to that of the angle B, when the nut 21 is adjusted to secure the arm in this newly adjusted position. When now moving the yoke 22 lengthwise of the bar 15 and toward the arm 18, the bar 24 will be advanced in the direction of the arm until its upper left hand corner engages the edge 19 of the arm. The positions of the arm 18 and the bar 23 have been illustrated in dot and dash lines in Figure 1. With the arm 23 adjusted to this new position as determined by the position of the arm 18, it automatically indicates on the scale of the bar 15 the precise length of the side B of the triangle and thus the exact distance from the end of the pipe at which the cut is to be made. It is to be understood that the point at which the edge 24 of the bar 23 intersects the edge 16 of the bar 15 is the point at which the distance is read upon the scale of the bar 15.

Although I have herein shown and described only one form of measuring instrument embodying my invention, it is to be understood that various changes and modifications may be made therein without departing from the spirit of the invention and the spirit and scope of the appended claim.

What I claim is:

A geometrical instrument comprising a horizontal bar provided with a linear scale, a protractor at one end of the bar, the center of said protractor being located at the end of the scale, an arm pivoted to said bar at the center of the protractor and adapted to move over the face of said protractor, said arm having a free outer end, a yoke mounted on said bar, supporting means on said yoke located on the same side of said bar as said arm, a vertical bar adjustably mounted in said supporting means in the same plane with said arm, whereby said vertical bar may be adjusted to support the free end of said arm.

ELIZABETH H. GATES.